United States Patent
Fu (10) Patent No.: US 8,080,491 B2
(45) Date of Patent: Dec. 20, 2011

(54) OPTICAL GLASS

(75) Inventor: Jie Fu, Kanagawa (JP)

(73) Assignee: Ohara Inc., Kanagawa (JP)

( * ) Notice: Subject to any disclaimer, the term of this patent is extended or adjusted under 35 U.S.C. 154(b) by 230 days.

(21) Appl. No.: 12/285,666

(22) Filed: Oct. 10, 2008

(65) Prior Publication Data

US 2009/0124481 A1    May 14, 2009

(30) Foreign Application Priority Data

Oct. 12, 2007  (JP) .................................. 2007-267046

(51) Int. Cl.
*C03C 3/068* (2006.01)
*C03C 3/066* (2006.01)
*C03C 3/15* (2006.01)

(52) U.S. Cl. ................ 501/78; 501/43; 501/50; 501/51; 501/79

(58) Field of Classification Search .................... 501/50, 501/51, 78, 79, 43
See application file for complete search history.

(56) References Cited

U.S. PATENT DOCUMENTS

| | | | | |
|---|---|---|---|---|
| 6,844,279 B2 * | 1/2005 | Hayashi et al. | ................ | 501/50 |
| 6,912,093 B2 * | 6/2005 | Endo | ................ | 359/642 |
| 6,977,232 B2 * | 12/2005 | Hayashi et al. | ................ | 501/79 |
| 2003/0100433 A1 * | 5/2003 | Hayashi et al. | ................ | 501/79 |
| 2003/0125186 A1 * | 7/2003 | Hayashi et al. | ................ | 501/50 |
| 2003/0211929 A1 * | 11/2003 | Hayashi et al. | ................ | 501/78 |
| 2005/0113240 A1 * | 5/2005 | Hayashi et al. | ................ | 501/50 |
| 2006/0079389 A1 * | 4/2006 | Hayashi | ................ | 501/50 |
| 2006/0234850 A1 * | 10/2006 | Hayashi et al. | ................ | 501/78 |
| 2007/0032366 A1 * | 2/2007 | Kasuga et al. | ................ | 501/64 |
| 2007/0232477 A1 * | 10/2007 | Fujiwara | ................ | 501/50 |
| 2008/0026928 A1 * | 1/2008 | Hayashi et al. | ................ | 501/78 |
| 2008/0119348 A1 * | 5/2008 | Hayashi et al. | ................ | 501/78 |
| 2008/0312062 A1 * | 12/2008 | Sasai et al. | ................ | 501/50 |
| 2009/0082190 A1 * | 3/2009 | Ogino | ................ | 501/78 |
| 2009/0099002 A1 * | 4/2009 | Fujiwara | ................ | 501/78 |
| 2009/0163345 A1 * | 6/2009 | Onoda et al. | ................ | 501/78 |

FOREIGN PATENT DOCUMENTS

| | | |
|---|---|---|
| JP | 8-73229 | 3/1996 |
| JP | 8-319124 | 12/1996 |
| JP | 2001-348244 | 12/2001 |

* cited by examiner

*Primary Examiner* — Karl Group
*Assistant Examiner* — Elizabeth A Bolden
(74) *Attorney, Agent, or Firm* — Hoffmann & Baron, LLP (57) ABSTRACT

An optical glass having high refractive index and low dispersion properties. There is provided an optical glass having an Abbe number ($v_d$) and a refractive index ($n_d$) in a region indicated by a shape bound by connecting three points, A(53, 1.70), B(53, 1.87), and C(40, 1.87) with straight lines on an orthogonal xy-coordinate system with the x-axis designating the Abbe number and the y-axis designating the refractive index; and comprising no less than 25% and no more than 65% of a combination of a $SiO_2$ component and a $B_2O_3$ component, no less than 20% and no more than 55% of a $Ln_2O_3$ component (Ln represents at least one species selected from the group consisting of La, Gd, Dy, Yb, and Lu), and a ratio of a $La_2O_3$ component to a $Ln_2O_3$ component being no more than 0.6, by mol % on the basis of oxides.

15 Claims, 1 Drawing Sheet

FIG. 1

OPTICAL GLASS

This application is based on and claims the benefit of priority from Japanese Patent Application No. 2007-267046, filed on 12 Oct. 2007, the content of which is incorporated herein by reference.

BACKGROUND OF THE INVENTION

1. Field of the Invention

The present invention relates to an optical glass having optical properties of a low dispersion and a high refractive index.

2. Related Art

In recent years, with a rapid advancement in integration and sophistication of devices using optical systems, there has been an increasing need for high-precision, light-weight, compact optical systems. Among others, due to the popularization of digital cameras, the demand for compact lenses is rising; to minimize the number of lenses, optical designs involving a high refractive index lens becoming the mainstream. In particular, demands are mounting for glass having a higher refractive index and a lower dispersion than conventional glass.

In the case of ordinary high refractive index and low dispersion glass, methods for increasing the refractive index commonly involve the use of rare earth oxides as a component for imparting a high refractive index. In particular, $La_2O_3$ is used most often since it facilitates stable production of high refractive index and low dispersion glass.

In recent years, however, needs have been increasing for optical glasses that have a lower dispersion than common optical glass with $La_2O_3$ as the main component. To manufacture such a glass, a method was attempted in which part of the $La_2O_3$ was replaced with $Gd_2O_3$ or the like, taking notice that $Gd_2O_3$ or the like was more likely to improve low dispersion properties than $La_2O_3$. However, this method failed to prove practical because, in the first place, a simple replacement of a part of or the whole of $La_2O_3$ with $Gd_2O_3$ or the like complicated the vitrification process tremendously. In addition, this method tended to yield a compromised refractive index; it was difficult to practically achieve low dispersion properties while maintaining a high refractive index. For example, the Patent Document 1 discloses a high refractive index and low dispersion optical glass of a $La_2O_3$ system into which $Gd_2O_3$ and $Y_2O_3$ were introduced. The glass described in this patent, despite achieving a high refractive index of 1.875 or above, provides an Abbe number of around 40, which falls short of sufficiently fulfilling the need of the market. Patent Document 1 Unexamined Japanese Patent Application, First Publication No. 2001-348244

SUMMARY OF THE INVENTION

As mentioned above, conventional glass containing $La_2O_3$ as the main component presented problems in achieving a lower dispersion (larger Abbe number) while maintaining a high refractive index. In addition, it was likewise difficult to produce an optical glass with a low dispersion and a maintained high refractive index by substituting a part of the constituents of existing glass containing $La_2O_3$ as the main component.

The present invention has been made to solve the above described problems; it provides an optical glass having high refractive index and low dispersion properties that were not achievable with conventional optical glass.

The present inventors have completed the present invention by including high contents of $Gd_2O_3$, $Dy_2O_3$, $Yb_2O_3$, and $Lu_2O_3$ in place of $La_2O_3$ while controlling the contents of $SiO_2$ and $B_2O_3$ as well as the total content thereof. In addition, the present inventors have completed the present invention based on the finding that inclusion of appropriate amounts of $Al_2O_3$, $GeO_2$, $Ga_2O_3$, and $P_2O_5$ enabled the inclusion of large amounts of $Gd_2O_3$, $Dy_2O_3$, $Yb_2O_3$, and $Lu_2O_3$ in place of $La_2O_3$, thereby providing a high refractive index and low dispersion optical glass having optical constants in a specific region that was not attainable previously. More specifically, the present invention provides the following.

In a first aspect, an optical glass has an Abbe number ($v_d$) and a refractive index ($n_d$) in a region indicated by a shape bound by connecting three points, A(53, 1.70), B(53, 1.87), and C(40, 1.87) with straight lines on an orthogonal xy-coordinate system with the x-axis designating the Abbe number and the y-axis designating the refractive index; and contains no less than 25% and no more than 65% of a combination of a $SiO_2$ component and a $B_2O_3$ component, no less than 20% and no more than 55% of a $Ln_2O_3$ component (Ln represents at least one species selected from the group consisting of La, Gd, Dy, Yb, and Lu), and a ratio of a $La_2O_3$ component to a $Ln_2O_3$ component being no more than 0.6, by mol % on the basis of oxides.

In a second aspect, the optical glass according to the first aspect contains no less than 3% of at least one component selected from the group consisting of $Al_2O_3$, $GeO_2$, $Ga_2O_3$, and $P_2O_5$, and has a ratio of a sum of the $Al_2O_3$, $GeO_2$, $Ga_2O_3$, and $P_2O_5$ components to a sum of the $SiO_2$ and $B_2O_3$ components being no less than 0.1 and no more than 0.8, by mol % on the basis of oxides.

In a third aspect, the optical glass according to the first aspect has a refractive index, $n_d$, of no less than 1.76 and an Abbe number, $v_d$, of no less than 44.

In a fourth aspect, the optical glass according to the first aspect contains no more than 20% of a $P_2O_5$ component, by mol % on the basis of oxides.

In a fifth aspect, the optical glass according to the first aspect contains no more than 30% of the combination of the $Al_2O_3$ and $Ga_2O_3$ components, by mol % on the basis of oxides.

In a sixth aspect, the optical glass according to the first aspect contains no more than 30% of the $GeO_2$ component, by mol % on the basis of oxides.

In a seventh aspect, the optical glass according to the first aspect contains a fluorine component.

In an eighth aspect, the optical glass according to the first aspect contains, by mol % on the basis of oxides:
$SiO_2$ in 3% to 65%;
$B_2O_3$ in 3% to 65%; and at least one of
$La_2O_3$ in 0% to 20%;
$Gd_2O_3$ in 0% to 55%;
$Dy_2O_3$ in 0% to 55%;
$Yb_2O_3$ in 0% to 55%;
$Lu_2O_3$ in 0% to 55%; in which
an $Ln_2O_3$ component (Ln representing at least one species selected from the group consisting of La, Gd, Dy, Yb, and Lu) is no less than 20% and no more than 55%;
$Al_2O_3$ in 0% to 30%;
$GeO_2$ in 0% to 30%;
$Ga_2O_3$ in 0% to 30%;
$P_2O_5$ in 0% to 20%;
$Li_2O$ in 0% to 10%;
$Na_2O$ in 0% to 10%;
$K_2O$ in 0% to 10%;
$Cs_2O$ in 0% to 10%; in which an $Rn_2O$ component (Rn represents at least one species selected from the group consisting of Li, Na, K, and Cs) is no more than 10%;

ZnO in 0% to 15%;
BaO in 0% to 15%;
SrO in 0% to 15%;
CaO in 0% to 15%;
MgO in 0% to 15%; in which an RO component (R represents at least one species selected from the group consisting of Zn, Ba, Sr, Ca, and Mg) is no more than 15%;

$Y_2O_3$ in 0% to 25%;
$SnO_2$ in 0% to 10%;
$ZrO_2$ in 0% to 10%;
$TiO_2$ in 0% to 10%; in which a total content of the $SnO_2$, $ZrO_2$, and $TiO_2$ components is no more than 10%;

$WO_3$ in 0% to 10%;
$Nb_2O_5$ in 0% to 10%;
$Ta_2O_5$ in 0% to 10%;
$Sb_2O_3$ in 0% to 5%;
$As_2O_3$ in 0% to 5%; in which a total content of the $Sb_2O_3$ and $As_2O_3$ components is no more than 5%.

In a ninth aspect, a preform for precision press molding consists of the optical glass according to the first aspect.

In a tenth aspect, an optical element is produced by subjecting the preform described in the ninth aspect to precision press molding.

In an eleventh aspect, an optical element consists of the optical glass according to the first aspect.

The present invention provides an optical glass having a high refractive index and low dispersion properties. It also produces such glass in a more stable manner than conventional optical glass.

DETAILED DESCRIPTION OF THE INVENTION

The optical glass of the invention has an Abbe number ($v_d$) and a refractive index ($n_d$) in the region indicated by a shape bound by connecting three points, A(53, 1.70), B(53, 1.87), and C(40, 1.87) with straight lines on an orthogonal xy-coordinate system with the x-axis designating the Abbe number and the y-axis designating the refractive index; and contains no less than 25% and no more than 65% of the combination of $SiO_2$ component and $B_2O_3$ component, no less than 20% and no more than 55% of $Ln_2O_3$ component (Ln represents at least one species selected from the group consisting of La, Gd, Dy, Yb, and Lu), and a ratio of $La_2O_3$ component to the $Ln_2O_3$ component being no more than 0.6, by mol % on the basis of oxides.

The embodiment of the optical glass according to the present invention is described in detail below; however, the invention is not limited in any way by the embodiments described below, and the invention can be carried out with modifications as appropriate within the object of the invention. Here, an explanation is optionally omitted to overlapping descriptions; however, it does not limit the aim of the invention.

Glass Components

The range of the composition for each component constituting the optical glass of the present invention is described below. Herein, the content of each component is represented in mol % on the basis of oxides, unless otherwise stated. The phrase "on the basis of oxides" refers to a presentation of a content of an individual component contained in a glass; by assuming complete decomposition and conversion into oxides at the time of melting of all oxides, carbonates, nitrates, and the like used as raw materials for the components constituting the glass of the invention, the content of each component is presented on the basis of the total molar amounts of the generated oxides taken as being equal to 100 mol %.

Essential Components and Optional Components

The $SiO_2$ component is a component that functions as a glass forming oxide; this component is very effective for improving the anti-devitrification property of the glass and increasing glass viscosity at the liquidus temperature. Therefore, the minimum content of the $SiO_2$ component is preferably 3%, more preferably 5%, and further more preferably 10%; most preferably the content of the $SiO_2$ component is no less than 10%. However, since an excess content is likely to cause deterioration of the refractive index, the maximum content of the $SiO_2$ component is preferably 65%, more preferably 60%, and most preferably 50%.

The $B_2O_3$ component is a component that serves as a glass forming oxide; this component is very effective for improving the anti-devitrification property of glass and increasing glass viscosity at the liquidus temperature. Therefore, the minimum content of the $B_2O_3$ component is preferably 3%, more preferably 5%, and most preferably 10%. However, since an excess content is likely to cause deterioration of the refractive index, the maximum content of the $B_2O_3$ component is preferably 65%, more preferably 60%, and most preferably 50%.

For production of a stable glass, at least one of the $SiO_2$ component and the $B_2O_3$ component is preferably contained. For production of a stable glass, the minimum total content of these components is preferably 25%, more preferably 30%, and most preferably 35%. However, since an excess content is likely to cause deterioration of the refractive index, the maximum content of these components is preferably 65%, more preferably 60%, and most preferably 50%.

According to the present invention, lower dispersion properties are achieved, as compared with ordinary high refractive index and low dispersion glasses that contain $La_2O_3$ as the main component, by incorporating higher contents of $Gd_2O_3$, $Dy_2O_3$, $Yb_2O_3$, and $Lu_2O_3$ components in place of the $La_2O_3$ component. This achievement is realized by the presence of an appropriate content of the $Ga_2O_3$ component and the like, which will be described below. That is, the composition of the individual components should be such that the ratio of $La_2O_3$/$Ln_2O_3$ ($Ln_2O_3$ represents the total amount of $La_2O_3$, $Gd_2O_3$, $Dy_2O_3$, $Yb_2O_3$, and $Lu_2O_3$) is preferably no more than 0.6, more preferably no more than 0.5, and most preferably no more than 0.4.

The $Ln_2O_3$ (Ln represents at least one species selected from La, Gd, Dy, Yb, and Lu) component is an essential component that has the effect of raising the refractive index while maintaining a low dispersion (a high Abbe number); however, an excess content thereof tends to enhance glass devitrification. Therefore, the maximum total content of the above component is preferably 55%, more preferably 50%, and most preferably 45%. In addition, for effective imparting of the abovementioned effect, the minimum total content of the $Ln_2O_3$ component is preferably 20%, more preferably 25%, and most preferably 28%.

The $La_2O_3$ component is an optional component effective for increasing the refractive index while maintaining a low dispersion (a large Abbe number); however, an excess content thereof tends to degrade glass stability and compromise anti-devitrification of the glass. Therefore, the maximum content of the $La_2O_3$ component is preferably 20%, more preferably 10%, and further more preferably 5%; most preferably the content of the $La_2O_3$ component is no more than 5%.

The $Gd_2O_3$ component is an optional component effective for increasing the refractive index while maintaining a low dispersion (a large Abbe number); however, an excess content thereof tends to compromise anti-devitrification of the glass. Therefore, the maximum content of the $Gd_2O_3$ component is preferably 55%, more preferably 50%, and most preferably 45%.

The $Dy_2O_3$ component is an optional component effective for increasing the refractive index while maintaining a low dispersion (a large Abbe number); however, an excess content thereof tends to compromise anti-devitrification of the glass. Therefore, the maximum content of the $Dy_2O_3$ component is preferably 55%, more preferably 50%, and most preferably 45%.

The $Yb_2O_3$ component is an optional component effective for increasing the refractive index while maintaining a low dispersion (a large Abbe number); however, an excess content thereof tends to degrade glass stability. Therefore, the maximum content of the $Yb_2O_3$ component is preferably 55%, more preferably 50%, and most preferably 45%.

The $Lu_2O_3$ component is an optional component effective for increasing the refractive index while maintaining a low dispersion (a large Abbe number); however, an excess content thereof tends to compromise anti-devitrification of the glass. Therefore, the maximum content of the $Lu_2O_3$ component is preferably 55%, more preferably 50%, and most preferably 45%.

For vitrification of the abovementioned rare earth oxide components in the abundant presence of $Gd_2O_3$, $Dy_2O_3$, $Yb_2O_3$, and $Lu_2O_3$, the total content of one or more of the components selected from the group consisting of $Al_2O_3$, $GeO_2$, $Ga_2O_3$, and $P_2O_5$ is preferably no less than 3%, more preferably no less than 5%, and most preferably no less than 10%.

In addition, the maximum total content of the $Al_2O_3$, $GeO_2$, $Ga_2O_3$, and $P_2O_5$ components is preferably 30%, more preferably 25%, and most preferably 22%.

In addition, an important factor for vitrification of the optical glass of the present invention is to control the ratio of the content of these components to the total content of the $SiO_2$ and $B_2O_3$ components, that is, the ratio of (sum of $Al_2O_3$, $GeO_2$, $Ga_2O_3$, and $P_2O_5$ contents)/(sum of $SiO_2$ and $B_2O_3$ contents). The lower limit of this ratio is preferably 0.1, more preferably 0.15, and most preferably 0.2; the upper limit of this ratio is preferably 0.80, more preferably 0.75, and most preferably 0.7.

The $Al_2O_3$ component is an optional component effective for improving the glass meltability and stability; however, an excess content thereof tends to decrease the refractive index and deteriorate glass stability. Therefore, the maximum content of the $Al_2O_3$ component is preferably 30%, more preferably 20%, and most preferably 15%.

The $Ga_2O_3$ component is an optional component effective for improving the glass meltability and stability as well as for enhancing the refractive index; however, an excess content thereof tends to elevate the melting temperature of the glass components and deteriorate glass stability. Therefore, the maximum content of the $Ga_2O_3$ component is preferably 30%, more preferably 25%, and most preferably 22%.

Here, the maximum total content of the $Al_2O_3$ and $Ga_2O_3$ components is preferably 30%, more preferably 25%, and most preferably 22%.

The $GeO_2$ component is an optional component effective for enhancing the refractive index and improving anti-devitrification; however, the amount of its use is restricted because of the high cost of its raw material. Therefore, the maximum content of the $GeO_2$ component is preferably 30%, more preferably 25%, and most preferably 20%.

The $P_2O_5$ component is an optional component effective for improving the glass meltability and stability; however, an excess content thereof tends to adversely affect the glass stability. Therefore, the maximum content of the $P_2O_5$ component is preferably 20%, more preferably 15%, and most preferably 10%.

The F (fluorine) component is an optional component effective for lowering glass dispersion (increasing the Abbe number), decreasing glass melting point, and improving glass stability; however, an excess content thereof tends to decrease glass refractive index. The content of fluorine in the optical glass composition of the present invention is expressed as an additional proportion to 100 mol % consisting of the other components. That is, the content of F is calculated by assuming that all components of the optical glass of the present invention are converted into oxides, and the total molar amount of all generated oxides is taken to be equal to 100%; the maximum content of F as fluorides partly or completely substituting one or more metal oxides is preferably 100%, more preferably 90%, and most preferably 80%.

The $Rn_2O$ (Rn represents at least one species selected from the group consisting of Li, Na, K, and Cs) component is an optional component effective for improving glass meltability and stability, and lowering the liquidus temperature. However, an excess content thereof tends to decrease the refractive index. Therefore, the maximum total content of these components is preferably 10%, more preferably 5%, and most preferably 3%.

The $Li_2O$ component is an optional component effective for improving glass meltability; however, an excess content thereof tends to decrease glass refractive index. Therefore, the maximum content of the $Li_2O$ component is preferably 10%, more preferably 5%, and most preferably 3%.

The $Na_2O$ component is an optional component that improves glass meltability; however, an excess amount thereof tends to decrease anti-devitrification and chemical durability of glass. Therefore, the maximum content of the $Na_2O$ component is preferably 10%, more preferably 5%, and most preferably 3%.

The $K_2O$ component is an optional component effective for improving glass meltability; however, an excess content thereof tends to decrease glass refractive index. Therefore, the maximum content of the $K_2O$ component is preferably 10%, more preferably 5%, and most preferably 3%.

The $Cs_2O$ component is an optional component effective for improving glass meltability; however, an excess content thereof tends to decrease glass refractive index. Therefore, the maximum content of the $Cs_2O$ component is preferably 10%, more preferably 5%, and most preferably 3%.

The RO (R represents at least one species selected from the group consisting of Zn, Ba, Sr, Ca, and Mg) component is an optional component effective for improving glass meltability and stability; however, an excess amount thereof tends to decrease glass refractive index. Therefore, the maximum content of the RO component is preferably 15%, more preferably 10%, and most preferably 5%.

The ZnO component is an optional component effective for improving the glass meltability and stability; however, an excess content thereof tends to decrease the refractive index. Therefore, the maximum content of the ZnO component is preferably 15%, more preferably 10%, and further more preferably 5%; most preferably the content of the ZnO component is no more than 5%.

The BaO component is an optional component effective for improving the glass meltability and stability; however, an excess content thereof tends to decrease the refractive index. Therefore, the maximum content of the BaO component is preferably 15%, more preferably 10%, and most preferably 5%.

The SrO component is an optional component effective for improving the glass meltability and stability; however, an excess content thereof tends to decrease the refractive index. Therefore, the maximum content of the SrO component is preferably 15%, more preferably 10%, and most preferably 5%.

The CaO component is an optional component effective for improving the glass meltability and stability; however, an excess content thereof tends to decrease the refractive index. Therefore, the maximum content of the CaO component is preferably 15%, more preferably 10%, and most preferably 5%.

The MgO component is an optional component effective for improving the glass meltability and stability; however, an excess content thereof tends to decrease the refractive index. Therefore, the maximum content of the MgO component is preferably 15%, more preferably 10%, and most preferably 5%.

The $Y_2O_3$ component is an optional component effective for lowering dispersion (increasing the Abbe number); however, an excess content thereof tends to interfere with preservation of target glass refractive index. Therefore, the maximum content of the $Y_2O_3$ component is preferably 25%, more preferably 18%, and most preferably 15%.

The $SnO_2$, $ZrO_2$, and $TiO_2$ components, which have an effect of improving glass refractive index, may be added at any amount; however, an excess content thereof tends to elevate glass dispersion (decrease the Abbe number). Therefore, the maximum total content of these components is preferably 10%, more preferably 8%, and most preferably 6%.

The $SnO_2$ component is an optional component that increases glass refractive index and contributes to glass stability; however, an excess content thereof tends to elevate glass dispersion and cause devitrification. Therefore, the maximum content of the $SnO_2$ component is preferably 10%, more preferably 5%, and most preferably 3%.

The $ZrO_2$ component is an optional component that increases glass refractive index, contributes to glass stability, and improves chemical durability; however, an excess content thereof tends to elevate glass dispersion and cause devitrification. Therefore, the maximum content of the $ZrO_2$ component is preferably 10%, more preferably 8%, and most preferably 6%.

The $TiO_2$ component is an optional component that increases glass refractive index, contributes to glass stability, and improves chemical durability; however, an excess content thereof tends to elevate glass dispersion and cause devitrification. Therefore, the maximum content of the $TiO_2$ component is preferably 10%, more preferably 5%, and most preferably 3%.

The $WO_3$ component is an optional component that increases glass refractive index and contributes to glass stability; however, an excess content thereof tends to elevate glass dispersion. Therefore, the maximum content of the $WO_3$ component is preferably 10%, more preferably 8%, and most preferably 6%.

The $Nb_2O_5$ component is an optional component that increases glass refractive index and contributes to glass stability; however, an excess content thereof tends to elevate glass dispersion. Therefore, the maximum content of the $Nb_2O_5$ component is preferably 10%, more preferably 8%, and most preferably 6%.

The $Ta_2O_5$ component is an optional component that increases glass refractive index and contributes to glass stability; however, an excess content thereof tends to elevate glass dispersion. Therefore, the maximum content of the $Ta_2O_5$ component is preferably 10%, more preferably 8%, and most preferably 6%.

The $Sb_2O_3$ and $As_2O_3$ components are a component that may be added at any content for removing bubbles from molten glass. A total $Sb_2O_3$ and $As_2O_3$ content of no more than 5% sufficiently imparts the effect. The total content is more preferably no more than 3%, and most preferably no more than 1%.

As described above, the $Sb_2O_3$ component is an optional component that may be added at any amount for removing bubbles from molten glass; however, an excess amount thereof requires environmental protection measures to be taken at the time of glass manufacturing, processing and disposal. Therefore, the maximum content of the $Sb_2O_3$ component is preferably 5%, more preferably 3%, and most preferably 1%.

As described above, the $As_2O_3$ component is an optional component that may be added at any amount for removing bubbles from molten glass; however, an excess amount thereof requires environmental protection measures to be taken at the time of glass manufacturing, processing and disposal. Therefore, the maximum content of the $As_2O_3$ component is preferably 5%, more preferably 31, and most preferably 1.

Components that should not be Contained

Other components may be added as appropriate in so far as they do not deteriorate the properties of the glass of the present invention. However, transition metal components excluding Ti, such as V, Cr, Mn, Fe, Co, Ni, Cu, Ag, and Mo, stain glass and produce visible light absorption at a specific wavelength, when they are added even in a small amount either singly or in combination. Therefore, it is preferable that these components be substantially excluded from optical glasses that transmit visible wavelength light.

The Th component may be added for increasing refractive index or glass stability, and the Cd and Tl components may be added for decreasing glass transition point (Tg). However, use of each of the Pb, Th, Cd, Tl, and Os components has been discouraged in recent years for being toxic compounds; therefore, their use requires environmental protection measures not only for glass manufacturing process, but also for processing and post-manufacture disposal processes. Accordingly, it is preferable that these components be substantially excluded where environmental impact is emphasized.

The lead component is cost ineffective, because it requires environmental protection measures to be taken at the time of glass manufacturing, processing and disposal. Therefore, the glass of the present invention should not contain the lead component.

Each of the components of the optical glass of the present invention is indicated in mol % on the basis of oxides, which cannot be instantly converted into mass percent values. However, the mass percent content of each component may be roughly shown as follows:

SiO$_2$ in 1% to 45%;
B$_2$O$_3$ in 1% to 45%; in which
a total content of the SiO$_2$ and B$_2$O$_3$ components is no more than 3% and no less than 45%; and at least one of
La$_2$O$_3$ in 0% to 50%;
Gd$_2$O$_3$ in 0% to 85%;
Dy$_2$O$_3$ in 0% to 85%;
Yb$_2$O$_3$ in 0% to 85%;
Lu$_2$O$_3$ in 0% to 85%; in which
an Ln$_2$O$_3$ component (Ln representing at least one species selected from the group consisting of La, Gd, Dy, Yb, and Lu) is no less than 25% and no more than 85%;
Al$_2$O$_3$ in 0% to 25%;
GeO$_2$ in 0% to 25%;
Ga$_2$O$_3$ in 0% to 30%;
P$_2$O$_5$ in 0% to 15%;
Li$_2$O in 0% to 10%;
Na$_2$O in 0% to 10%;
K$_2$O in 0% to 10%;
Cs$_2$O in 0% to 10%; in which
an Rn$_2$O component (Rn represents at least one species selected from the group consisting of Li, Na, K, and Cs) is no more than 10%;
ZnO in 0% to 15%;
BaO in 0% to 15%;
SrO in 0% to 15%;
CaO in 0% to 10%;
MgO in 0% to 10%; in which
an RO component (R represents at least one species selected from the group consisting of Zn, Ba, Sr, Ca, and Mg) is no more than 15%;
Y$_2$O$_3$ in 0% to 50%;
SnO$_2$ in 0% to 10%;
ZrO$_2$ in 0% to 10%;
TiO$_2$ in 0% to 10%; in which
a total content of the SnO$_2$, ZrO$_2$, and TiO$_2$ components is no more than 10%;
WO$_3$ in 0% to 15%;
Nb$_2$O$_5$ in 0% to 15%;
Ta$_2$O$_5$ in 0% to 15%;
Sb$_2$O$_3$ in 0% to 5%;
As$_2$O$_3$ in 0% to 5%.

Physical Properties

Figure 1:
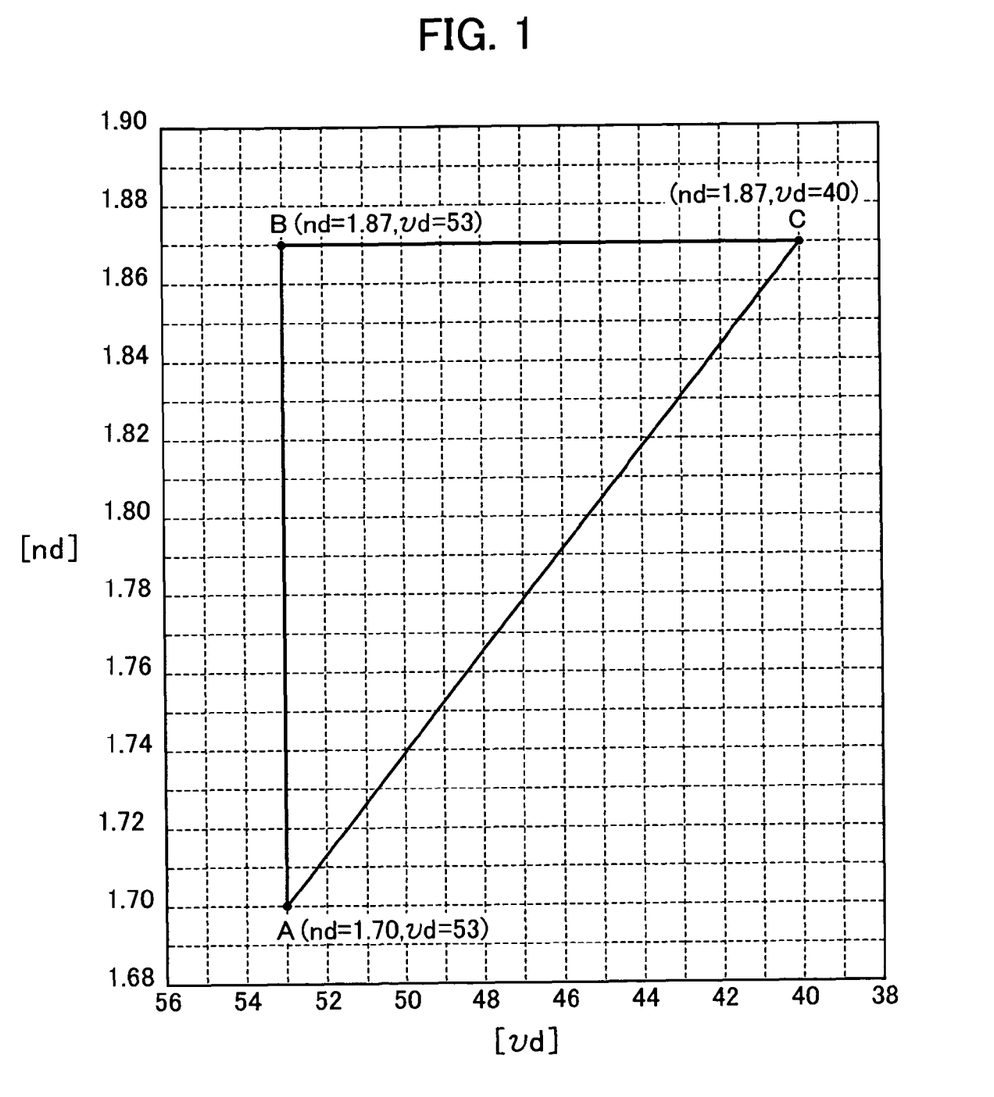
FIG. 1 represents an xy-orthogonal coordinate plane indicating the region of optical constants (Abbe number and refractive index), in which the x-axis designates the Abbe number and the y-axis designates the refractive index.

The optical glass of the present invention is most remarkably characterized in that it has an Abbe number ($v_d$) and a refractive index ($n_d$) in a region indicated by a shape (triangle) bound by connecting three points, A(53, 1.70), B(53, 1.87), and C(40, 1.87) with straight lines on an orthogonal xy-coordinate system with the x-axis representing the Abbe number and the y-axis representing the refractive index. Generally, optical glass with a larger refractive index ($n_d$) tends to have a higher dispersion (a smaller Abbe number). This tendency did not prevail owing to a lack of demand for high refractive index and low dispersion glass as indicated by the region bound by A, B, and C. On the contrary, there was a great need for the glass with properties corresponding to this region. The reason why such a glass was nevertheless not developed practically was that components effective for improving the refractive index had an effect of elevating dispersion simultaneously and that components that had a significant effect for imparting a high refractive index and lowering dispersion were likely to impair glass stability, thereby failing to produce a practical glass. Thus, high refractive index glasses disclosed in the past had $v_d$-$n_d$ plots in the higher dispersion side of the line AC in the $v_d$-$n_d$ coordinate plane. It is proper to state that the present invention, which realized glasses corresponding to the region surrounded by lines AB, BC, and CA by using methods that have not been suggested by any conventionally known literature, has realized glasses of a demanding and longstanding need that were extremely difficult to produce.

The refractive index of the optical glass of the present invention is associated with no problems as long as it falls in the abovementioned ABC region. In particular, the refractive index, being in the ABC region, is more preferably no less than 1.76 and most preferably no less than 1.78. In addition, the Abbe number is more preferably no less than 44, and most preferably no less than 46.

It is preferable for not only the optical glass of the present invention, but also for optical glass in general, to have a low glass transition point (Tg). For the optical glass of the present invention, the upper limit of the glass transition point (Tg) is preferably 850° C., more preferably 830° C., and most preferably 810° C.

Manufacturing Method

The manufacturing method of the optical glass of the present invention is not particularly limited as long as it is a conventional method to manufacture optical glass. For example, the optical glass can be manufactured using a method as follows. A predetermined amount of each starting raw material (oxide, carbonate, nitrate, phosphate, sulfate, fluoride, etc.) is weighed, and then mixed uniformly. After the mixed raw material is poured into a quartz crucible or an alumina crucible and roughly melted, the melted material is poured into a gold crucible, a platinum crucible, a platinum alloy crucible, or an iridium crucible and melted at a temperature in the range of 1300° C. to 1600° C. for 1 to 10 hours in a melting furnace. Subsequently, the melted material is stirred to homogeneity, cooled to a proper temperature, and cast into a mold or the like to produce glass.

Preforms and Optical Elements

Depending on the purpose of use and the like, the optical glass composition of the present invention may also be used for the production of optical elements and the like, in which the optical glass composition is used as a preform for forming a glass mold to be heat-softened and then subjected to precision press molding. In addition, molten glass can be subjected to direct pressing for production of optical elements and the like. When the optical glass is used as a preform, the manufacturing method and the hot molding method are not particularly limited, and a publicly known manufacturing method and molding method can be used. The preform can be manufactured directly from the molten glass using the glass gob molding method disclosed, for example, in Unexamined Japanese Patent Application, First Publication No. 1996-319124, and using the manufacturing method and instrument disclosed in Unexamined Japanese Patent Application, First Publication No. 1996-73229. The preform can also be manufactured by subjecting a plate-shape molded material to cold processing such as grinding, polishing, and the like. Furthermore, instead of using precision press molding, the optical elements may be manufactured by cold processing such as grinding, polishing, and the like, or by cold processing of a reheated, pressed material.

The method for precision press molding is not particularly limited, and a publicly known method can be used for molding the glass.

EXAMPLES

Hereinafter, the present invention is further explained with reference to embodiments; however, the present invention should not be construed as being limited to the following embodiments in any way.

Examples 1 to 12

The starting materials were weighed according to the composition (units of mol %) for Examples 1 to 12 shown in Tables 1 and 2, mixed uniformly, then placed in a platinum crucible, and molten at 1450° C. to 1550° C. for 2 to 4 hours. Subsequently, the molten material was cast into a mold to produce a glass.

Comparative Examples 1 and 2

The starting materials were weighed according to the composition (units of mol %) for Comparative Examples 1 and 2 shown in Table 2, and the same procedure as for Examples 1 to 12 was used to produce glass.

Refractive indices ($v_d$) and Abbe numbers ($n_d$) were measured according to JOGIS01-2003 for the glasses subjected to cooling at a cooling rate of −25° C./hr after being maintained at a temperature near their glass transition point (Tg) for 2 hours.

TABLE 1

| | Example (mol %) | | | | | | |
|---|---|---|---|---|---|---|---|
| | 1 | 2 | 3 | 4 | 5 | 6 | 7 |
| $SiO_2$ | 15 | 15 | 15 | 15 | 15 | 15 | 15 |
| $B_2O_3$ | 35 | 25 | 25 | 25 | 25 | 25 | 25 |
| $GeO_2$ | | | | | | | 15 |
| $P_2O_5$ | | 5 | 5 | 5 | 5 | | 5 |
| $Al_2O_3$ | | | | | | | |
| $Ga_2O_3$ | 20 | 15 | 15 | 15 | 15 | 20 | |
| ZnO | | | | | | | |
| $Gd_2O_3$ | 30 | 40 | | | | 10 | 10 |
| $Dy_2O_3$ | | | 40 | | | | |
| $Yb_2O_3$ | | | | 40 | | | |
| $Lu_2O_3$ | | | | | 40 | 30 | 30 |
| $Y_2O_3$ | | | | | | | |
| $La_2O_3$ | | | | | | | |
| $ZrO_2$ | | | | | | | |
| $WO_3$ | | | | | | | |
| $Ta_2O_5$ | | | | | | | |
| $Sb_2O_3$ | | | | | | | |
| Total | 100 | 100 | 100 | 100 | 100 | 100 | 100 |
| F (added in addition to the above) | | | | | | | |
| $La_2O_3/Ln_2O_3$ | 0 | 0 | 0 | 0 | 0 | 0 | 0 |
| $(Al_2O_3 + GeO_2 + Ga_2O_3 + P_2O_5)/(SiO_2 + B_2O_3)$ | 0.4 | 0.5 | 0.5 | 0.5 | 0.5 | 0.5 | 0.5 |
| Tg (° C.) | 720 | 760 | 765 | 776 | 780 | 760 | 802 |
| nd | 1.799 | 1.832 | 1.823 | 1.800 | 1.795 | 1.834 | 1.794 |
| vd | 47.3 | 46.2 | 46.3 | 49.0 | 49.3 | 46.1 | 50.2 |

TABLE 2

| | Example (mol %) | | | | | Comparative Example 1 | Comparative Example 2 |
|---|---|---|---|---|---|---|---|
| | 8 | 9 | 10 | 11 | 12 | | |
| $SiO_2$ | 15 | 15 | 15 | 33.4 | 16.6 | 15 | 15 |
| $B_2O_3$ | 35 | 25 | 25 | 16.6 | 27.8 | 25 | 30 |
| $GeO_2$ | | | | | | | 10 |
| $P_2O_5$ | | 5 | 5 | | 5.6 | 5 | |
| $Al_2O_3$ | | | | 11.2 | 5.6 | | |
| $Ga_2O_3$ | 15 | 15 | 15 | | 5.6 | 15 | 5 |
| ZnO | | | 1 | | | | |
| $Gd_2O_3$ | 30 | 20 | 15 | 38.8 | 38.8 | | 10 |
| $Dy_2O_3$ | | | | | | | |
| $Yb_2O_3$ | | | | | | | |
| $Lu_2O_3$ | | | 20 | | | | |
| $Y_2O_3$ | | 4.9 | 2 | | | | |
| $La_2O_3$ | | 10 | | | | 40 | 30 |
| $ZrO_2$ | 5 | | 1 | | | | |
| $WO_3$ | | | 1 | | | | |

TABLE 2-continued

| | Example (mol %) | | | | | Comparative Example 1 | Comparative Example 2 |
|---|---|---|---|---|---|---|---|
| | 8 | 9 | 10 | 11 | 12 | | |
| $Ta_2O_5$ | | 5 | | | | | |
| $Sb_2O_3$ | | 0.1 | | | | | |
| Total | 100 | 100 | 100 | 100 | 100 | 100 | 100 |
| F (added in addition to the above) | | | | 66.6 | 66.6 | | |
| $La_2O_3/Ln_2O_3$ | 0 | 0.33 | 0 | 0 | 0 | 1 | 0.75 |
| $(Al_2O_3 + GeO_2 + Ga_2O_3 + P_2O_5)/(SiO_2 + B_2O_3)$ | 0.3 | 0.5 | 0.5 | 0.22 | 0.38 | 0.5 | 0.333 |
| Tg (° C.) | 725 | 736 | 770 | 723 | 685 | | |
| nd | 1.811 | 1.835 | 1.803 | 1.769 | 1.802 | Devitrified, physical properties undeterminable | Devitrified, physical properties undeterminable |
| νd | 46.8 | 44.0 | 47.5 | 51.8 | 49.3 | | |

As shown in Tables 1 and 2, Examples 1 to 12 demonstrated a high refractive index; the refractive indices were all 1.76 or more. In addition, the Abbe numbers for all these optical glasses were 44 or more, indicating low dispersion.

Moreover, the refractive indices and Abbe numbers of Examples 1 to 12 fall in the region bounded by straight borderlines that connect points A, B, and C. On the other hand, Comparative Examples 1 and 2 showed glass devitrification and failed to provide a high refractive index and low dispersion optical glass.

I claim:

1. An optical glass having an Abbe number ($v_d$) and a refractive index ($n_d$) in a region indicated by a shape bound by connecting three points, A(53, 1.70), B(53, 1.87), and C(40, 1.87) with straight lines on an orthogonal xy-coordinate system with the x-axis designating the Abbe number and the y-axis designating the refractive index, and having the refractive index, $n_d$, of no less than 1.794; and
  comprising no less than 25% and no more than 65% of a combination of a $SiO_2$ component and a $B_2O_3$ component, no less than 20% and no more than 55% of a $Ln_2O_3$ component (Ln represents at least one species selected from the group consisting of La, Gd, Dy, Yb, and Lu), no more than 35% of the $B_2O_3$ component, no more than 15% of a ZnO component, and a ratio of the $La_2O_3$ component to the $Ln_2O_3$ component being no more than 0.6, and a ratio of a sum of $Al_2O_3$, $GeO_2$, $Ga_2O_3$, and $P_2O_5$ components to a sum of the $SiO_2$ and $B_2O_3$ components being no less than 0.15 and no more than 0.8, by mol % on the basis of oxides.

2. The optical glass according to claim 1, comprising no less than 15% of at least one component selected from the group consisting of $Al_2O_3$, $GeO_2$, $Ga_2O_3$, and $P_2O_5$, by mol % on the basis of oxides.

3. The optical glass according to claim 1, having an Abbe number, $v_d$, of no less than 44.

4. The optical glass according to claim 1, comprising no more than 20% of a $P_2O_5$ component, by mol % on the basis of oxides.

5. The optical glass according to claim 1, comprising no more than 30% of the combination of the $Al_2O_3$ and $Ga_2O_3$ components, by mol % on the basis of oxides.

6. The optical glass according to claim 1, comprising no more than 30% of the $GeO_2$ component, by mol % on the basis of oxides.

7. The optical glass according to claim 1, comprising a fluorine component.

8. The optical glass according to claim 1, comprising, by mol % on the basis of oxides:
  $SiO_2$ in 3% to 65%; and at least one of
  $Gd_2O_3$ in 0% to 55%;
  $Dy_2O_3$ in 0% to 55%;
  $Yb_2O_3$ in 0% to 55%;
  $Lu_2O_3$ in 0% to 55%; in which
  an $Ln_2O_3$ component (Ln representing at least one species selected from the group consisting of La, Gd, Dy, Yb, and Lu) is no less than 20% and no more than 55%;
  $Al_2O_3$ in 0% to 30%;
  $GeO_2$ in 0% to 30%;
  $Ga_2O_3$ in 0% to 30%;
  $P_2O_5$ in 0% to 20%;
  $Li_2O$ in 0% to 10%;
  $Na_2O$ in 0% to 10%;
  $K_2O$ in 0% to 10%;
  $Cs_2O$ in 0% to 10%; in which
  an $Rn_2O$ component (Rn represents at least one species selected from the group consisting of Li, Na, K, and Cs) is no more than 10%;
  BaO in 0% to 15%;
  SrO in 0% to 15%;
  CaO in 0% to 15%;
  MgO in 0% to 15%; in which
  an RO component (R represents at least one species selected from the group consisting of Zn, Ba, Sr, Ca, and Mg) is no more than 15%;
  $Y_2O_3$ in 0% to 25%;
  $SnO_2$ in 0% to 10%;
  $ZrO_2$ in 0% to 10%;
  $TiO_2$ in 0% to 10%; in which
  a total content of the $SnO_2$, $ZrO_2$, and $TiO_2$ components is no more than 10%;
  $WO_3$ in 0% to 10%;
  $Nb_2O_5$ in 0% to 10%;
  $Ta_2O_5$ in 0% to 10%;
  $Sb_2O_3$ in 0% to 5%;
  $As_2O_3$ in 0% to 5%; in which
  a total content of the $Sb_2O_3$ and $As_2O_3$ components is no more than 5%.

9. A preform for the precision press molding consisting of an optical glass according to claim 1.

10. An optical element produced by subjecting the preform according to claim 9 to precision press molding.

11. An optical element consisting of an optical glass according to claim 1.

12. The optical glass according to claim 1, comprising no less than 15% of the $SiO_2$ component, by mol % on the basis of oxides.

13. The optical glass according to claim 1, comprising no more than 1% of a ZnO component, by mol % on the basis of oxides.

14. The optical glass according to claim 1, comprising no more than 10% of a $La_2O_3$ component, by mol % on the basis of oxides.

15. The optical glass according to claim 1, having a ratio of the $La_2O_3$ component to the $Ln_2O_3$ component being no more than 0.5, by mol % on the basis of oxides.

* * * * *

UNITED STATES PATENT AND TRADEMARK OFFICE
CERTIFICATE OF CORRECTION

PATENT NO.         : 8,080,491 B2                                      Page 1 of 1
APPLICATION NO.    : 12/285666
DATED              : December 20, 2011
INVENTOR(S)        : Jie Fu It is certified that error appears in the above-identified patent and that said Letters Patent is hereby corrected as shown below:

Column 8, line 36, replace "...more preferably 31, and most preferably..." with --...more preferably 3%, and most preferably...--.

Signed and Sealed this
Twenty-eighth Day of February, 2012

David J. Kappos
*Director of the United States Patent and Trademark Office*